(12) United States Patent
Suresh (10) Patent No.: US 11,288,289 B2
(45) Date of Patent: *Mar. 29, 2022

(54) MULTI-TENANT DATA INTEGRATION

(71) Applicant: [24]7.ai, Inc., San Jose, CA (US)

(72) Inventor: Srinivasan Suresh, Alameda, CA (US)

(73) Assignee: [24]7.ai, Inc., San Jose, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 16/241,087

(22) Filed: Jan. 7, 2019

(65) Prior Publication Data

US 2019/0171651 A1 Jun. 6, 2019

Related U.S. Application Data

(63) Continuation of application No. 13/908,948, filed on Jun. 3, 2013, now Pat. No. 10,255,344.

(60) Provisional application No. 61/655,396, filed on Jun. 4, 2012.

(51) Int. Cl.
*G06F 16/28* (2019.01)
*G06F 16/25* (2019.01)

(52) U.S. Cl.
CPC .......... *G06F 16/283* (2019.01); *G06F 16/252* (2019.01)

(58) Field of Classification Search
CPC .............................. G06F 16/283; G06F 16/252
USPC ........................................................ 707/606
See application file for complete search history.

(56) References Cited

U.S. PATENT DOCUMENTS

| | | | |
|---|---|---|---|
| 6,532,465 B2 | 3/2003 | Hartley et al. | |
| 6,594,786 B1 * | 7/2003 | Connelly | G06F 11/008 709/224 |
| 8,180,332 B2 | 5/2012 | Ramer et al. | |
| 8,244,759 B2 | 8/2012 | Tzuo et al. | |
| 8,504,556 B1 | 8/2013 | Dierkes et al. | |
| 2002/0042921 A1 | 4/2002 | Ellis | |
| 2005/0027559 A1 | 2/2005 | Rajan et al. | |
| 2005/0188345 A1 | 8/2005 | Chang et al. | |
| 2005/0228808 A1 | 10/2005 | Mamou et al. | |
| 2005/0268309 A1 * | 12/2005 | Krishnaswamy | G06F 9/548 719/330 |
| 2006/0031225 A1 | 2/2006 | Palmeri et al. | |
| 2006/0161513 A1 | 7/2006 | Drumm et al. | |
| 2007/0185902 A1 | 8/2007 | Messinger et al. | |
| 2008/0028068 A1 | 1/2008 | Nochta et al. | |
| 2009/0187970 A1 | 7/2009 | Mower et al. | |
| 2010/0063959 A1 | 3/2010 | Doshi et al. | |
| 2010/0161648 A1 | 6/2010 | Eberlein et al. | |
| 2011/0282969 A1 | 11/2011 | Iyer et al. | |
| 2012/0059795 A1 | 3/2012 | Hersh et al. | |
| 2012/0174064 A1 | 7/2012 | Polly et al. | |
| 2012/0197948 A1 | 8/2012 | Tsai et al. | |
| 2012/0331016 A1 * | 12/2012 | Janson | G06F 16/25 707/809 |
| 2013/0031496 A1 * | 1/2013 | Mathrubootham | G06F 3/048 715/764 |

(Continued)

OTHER PUBLICATIONS

"Oracle Fusion Middleware Concepts Guide", 11g Release 1 (11.1.1), E10103-03, Jan. 2010, 76 pages.

*Primary Examiner* — Hicham Skhoun (74) *Attorney, Agent, or Firm* — Perkins Coie LLP; Michael Glenn; Andrew T. Pettit (57) ABSTRACT

An enterprise application integration system (EAIS) is disclosed that enables customer service applications to access and share data with enterprise information systems in real time.

23 Claims, 11 Drawing Sheets

(56) References Cited

U.S. PATENT DOCUMENTS

| | | |
|---|---|---|
| 2013/0191494 A1 | 7/2013 | Sidhu et al. |
| 2013/0238641 A1 | 9/2013 | Mandelstein et al. |
| 2013/0238729 A1 | 9/2013 | Holzman et al. |
| 2013/0275695 A1 | 10/2013 | Ponsford et al. |
| 2013/0304431 A1 | 11/2013 | Kannegala et al. |
| 2013/0318061 A1* | 11/2013 | Said .................... G06F 16/252 707/705 |
| 2013/0318152 A1 | 11/2013 | Iyer et al. |
| 2013/0324069 A1 | 12/2013 | Chen et al. |

* cited by examiner

MULTI-TENANT DATA INTEGRATION

CROSS-REFERENCE TO RELATED APPLICATIONS

This application is a continuation of U.S. application Ser. No. 13/908,948 filed on Jun. 3, 2013, which claims priority to U.S. Provisional Application No. 61/655,396, filed on Jun. 4, 2012, each of which is herein incorporated in its entirety by this reference thereto.

TECHNICAL FIELD

The invention relates to a system and architecture that enables customer service applications to access and share data with enterprise information systems in real time.

BACKGROUND

To automate customer service functions, business applications need to exchange data with a variety of enterprise information systems, such as: customer relationship management systems (for managing customer profiles and transactions), supply chain management systems (for managing logistics and procurement), order entry systems, and e-commerce systems. Enterprise Application Integration (EAI) tools have emerged to enable business applications to connect and share data with multiple information systems. These tools shield applications from the development and maintenance burden required to link data across systems that use different data structures, run on different architectures, or are provided by different vendors.

Current EAI tools have a number of limitations. These tools are heavyweight, requiring specialized staff for system administration. They may not use business objects or, if they use business objects, these business objects are vendor-specific, or are limited to business objects from one specific business vertical, e.g. health care, travel, insurance, etc. As a result, these tools facilitate integration with information systems from only a single vendor or a specific vertical. These tools are low-level; they essentially comprise a programming model and a development kit that provides only basic building blocks. Current tools will support a predefined set of data protocols, and cannot be easily extended to handle custom protocols. These tools do not monitor and adapt their operation to the quality of service of the connected enterprise information systems. Also, current tools were designed and architected for single-tenant use, and force the deployment of multiple instances to handle multi-tenant applications.

SUMMARY

Embodiments of the herein disclosed invention provide an enterprise application integration system (EAIS) that has improved functionality. Also disclosed herein is a system and method for supporting multi-tenants from a single EAIS. Further disclosed herein is an EAIS that provides services in different business verticals. Further disclosed herein is a system and method for creating objects which are an abstraction of a business flow, and which enable the EAIS to reuse objects to serve customers quickly.

DETAILED DESCRIPTION

Embodiments of the invention enable an enterprise application integration systems (EAIS) to serve different business verticals of same client or different clients, i.e. multi-tenancy.

In one embodiment, the invention enables applications to interact with information systems through business objects, which are a high level abstraction of a business entity, including its data structure and associated business logic. Such business objects can be created in an EAIS and can be reused across applications.

In an yet another embodiment of the invention, custom protocol and data formats are created in an EAIS or added to an EAIS to extend the capability of the EAIS when interacting with information systems that have different data formats.

Figure 1:
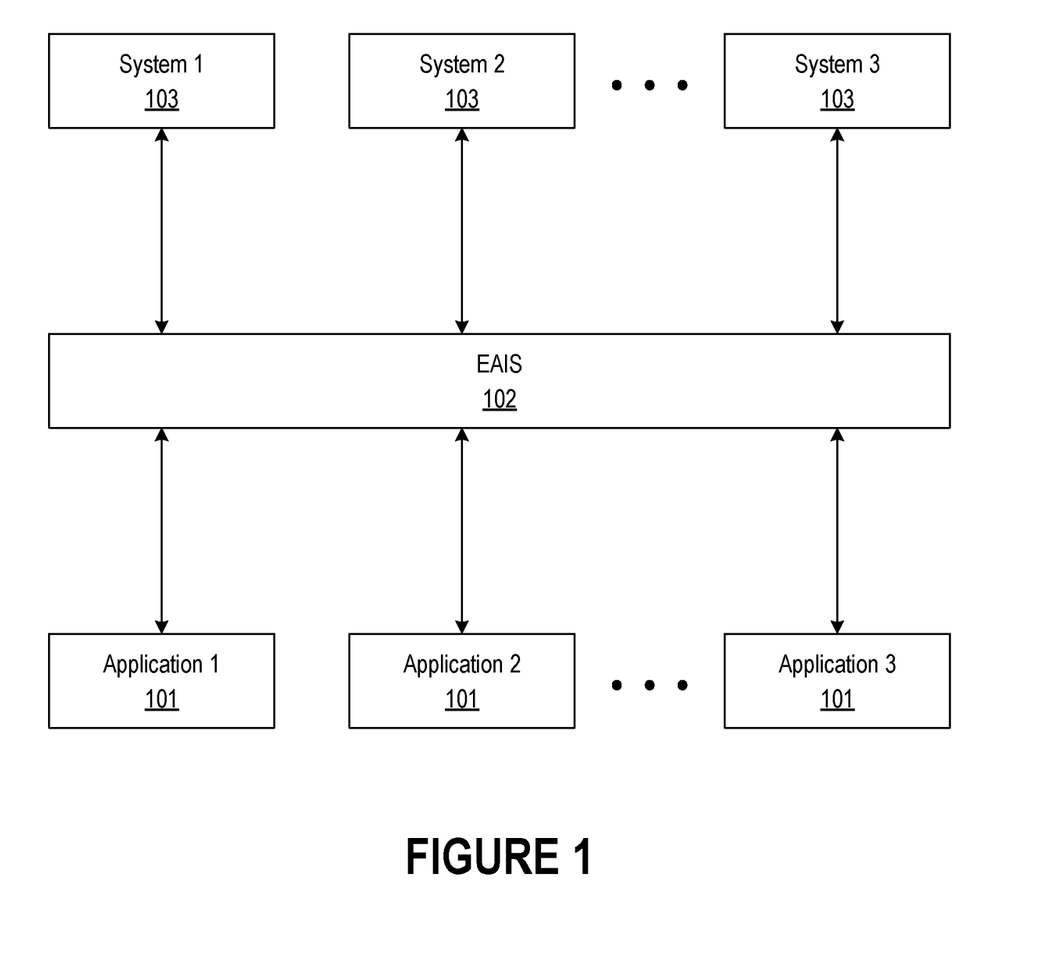
FIG. 1 is a block schematic diagram that shows a system according to the invention.

FIG. 1 is a block schematic diagram that shows a system according to the invention. The system comprises a plurality of business applications 101 (Application 1, Application 2, . . . , Application n), an EAIS 102, and a plurality of enterprise information systems 103 (System 1, System 2, . . . , System 3) that serve the applications.

The EAIS serves as a middleware between applications and enterprise information systems. The EAIS performs multiple tasks on behalf of applications related to accessing or updating data, which can include fetching a customer's profile details, such as their account number, address, preferences, interaction history, etc.; validating a customer's identity; obtaining the logic and rules for implementing a business workflow; sending the context of a customer interaction in preparation for a transfer to a human agent; and so on.

Figure 2:
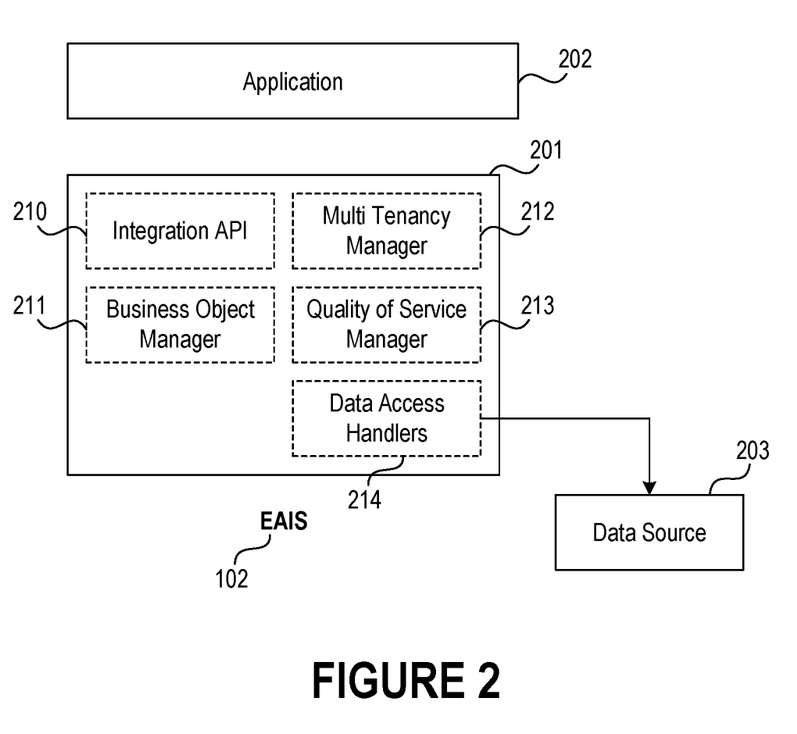
FIG. 2 is a block schematic diagram that shows an EAIS according to the invention.

FIG. 2 is a block schematic diagram that shows an EAIS 102 according to the invention. The system comprises a business application 202; an EAIS 201 that comprises an integration API 210, a business object manager 211, a multi-tenancy manager 212, a quality of service manager 213, and data access handlers 214; and a data source 203.

The application 202 uses the services of the EAIS to access and share data with one or more enterprise information systems and their associated data sources.

In one embodiment of the invention, the EAIS provides an integration API 210 for applications to interact with information systems through business objects. This API enables a business application to retrieve, update, or execute operations on a business object.

Business objects are used to represent enterprise data across different information systems in a standardized way. Business applications interact with business objects via logical operations, which are mapped by the EAIS to physical operations specific to each information system. As a result, application logic is shielded from changes to the source information systems. For example, the following Java code shows the retrieval of a list of nearby stores using the business object "Store" according to one embodiment of the invention. In this example, the application is isolated from the technical details of interacting with the data source that maintains the stores, which may comprise files, databases, Web services, application interfaces or other data systems.

```
// Locate stores for a retailer in the
// given latitude, longitude.
List<Store> stores =
    store.getNearbyStores(0.0, 180.0, -180.0, 180.0);
```

The business object manager (BOM) 211 enables the definition of business objects that are maintained in the business object repository. Business objects can be organized by application type, tenant, vertical, or other attributes that are useful to the application developer. The BOM provides a discovery mechanism that allows an application developer to browse or search for business objects in the business object repository, and then allows the developer to choose the business objects to be used in the application based on its requirements.

In one embodiment of the invention, applications belonging to different companies are supported by the same EAIS with the help of the multi-tenancy manager 213. For purposes of the discussion herein, multi-tenancy refers to a principle in software architecture where a single instance of the software runs on a server, serving multiple client organizations (tenants). Multi-tenancy is contrasted with a multi-instance architecture where separate software instances or hardware systems are set up for different client organizations. With a multi-tenant architecture, a software application is designed to partition its data and configuration virtually, and each client organization works with a customized virtual application instance. Multi-tenancy is also regarded as one of the essential attributes of cloud computing. More specifically, in connection with embodiments of the invention, multi-tenancy occurs where business applications that belong to different businesses are accommodated simultaneously, each application being isolated to only the services relevant to them. In one embodiment of the invention, the system administrator can add a new tenant or remove an existing tenant. In another embodiment, the EAIS is dedicated to serve only one tenant.

The data access handlers 214 (DAH) interact with different information systems and their associated data sources, such as files, databases, Web services, application interfaces. The data sources can be heterogeneous in nature. The DAH collects data according to the customer's requirements. In one embodiment of the invention, the DAH caches data that does not change frequently, such that it is easy and quick to serve customers as and when they request that data. In one embodiment of the invention, the DAH converts one data type to another data type, for example XML to comma-separated values, so that the DAH can interact with different data types, collect data, and convert the data into the format the customer requires. In another embodiment of the invention, new data formats can be added into the DAH as and when a new format is available in the market, such that that DAH is able to access data in all formats and present it to the customer.

The quality of services manager (QOS) 213 helps in improving the quality of services that are provided to the business application. The QOS tests the functionality of different enterprise information systems periodically to determine operational performance, such as responsiveness, availability, and reliability. In one embodiment of the invention, the QOS provides an interface to monitor and view the quality and performance of data requests made by applications that use the EAIS. For example, the QOS can report on the number of data requests made by applications, the number of successful and unsuccessful responses from information systems, and the average response times categorized by any combination of the following variables: application, information system, tenant, business object, and time period.

In another embodiment of the invention, the QOS implements rate limit access to ensure that the enterprise information system is protected from excessive rates of access, which might otherwise impact the information system response time. In another embodiment of the invention, the QOS retries failed operations a number of times, up to a defined limit, thus allowing resilient access to information systems facing intermittent issues such as transient network hiccups. In an embodiment of the invention, the QOS implements a proactive heartbeat mechanism that allows an application to determine a priori whether an information system is reachable. According to one embodiment of the invention, an information system is considered to be unreachable when it fails to respond to data requests within a predetermined time, also known as a time out. If the information system is unreachable, the application can adapt its behavior, e.g. by informing an end user of an outage or by using an alternative process to complete a desired transaction, thus maintaining a high quality customer experience. In one embodiment of the invention, the QOS can quickly fail over to alternate enterprise information system to access data when one enterprise system is unreachable. Control for quality of service features such as rate limit access, retries, proactive heartbeat, time out limits, and fail over mechanisms can be adjusted on any of per-application, per-tenant, per business object, and per information system.

Figure 3:
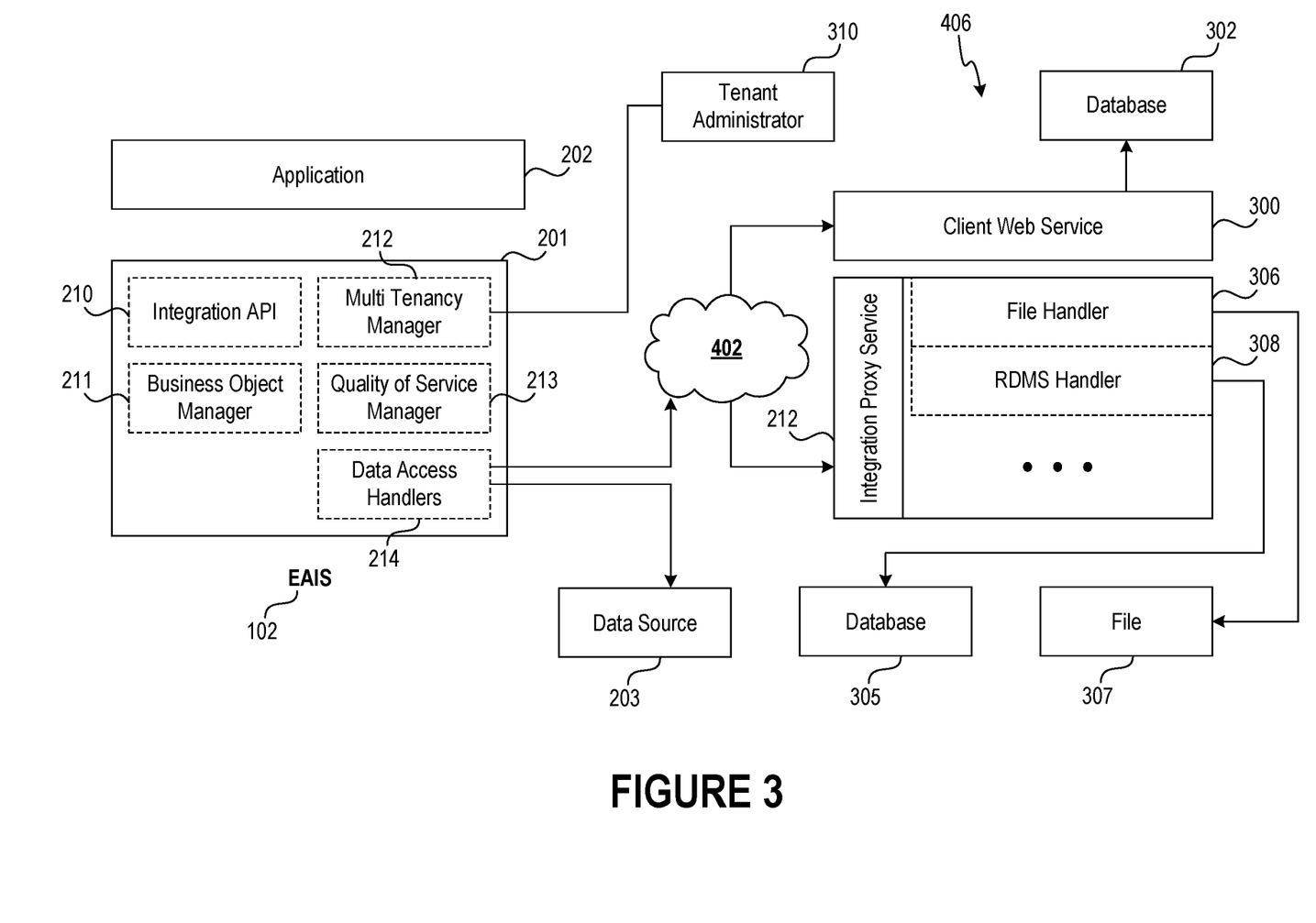
FIG. 3 is a block schematic diagram that shows another embodiment of the EAIS according to the invention.

FIG. 3 is a block schematic diagram that shows another embodiment of the EAIS according to the invention. The DAH can collect data by interacting with an information system 406 that includes client Web services 300 which, in turn, access a database 302. If an information system is remote from the DAH and lacks Web services or other interfaces for remote access, an integration proxy service 304 is installed that connects the DAH to the data sources 305 and 307 of this remote information system.

The EAIS is configurable with different protocols and can include custom made protocols; this enables the DAH, which is part of EAIS, to handle different data formats. The DAH interacts with different data sources which supply data in different data formats, such as a file 307 that is supplied by a file handler 306, an RDMS query format supplied by an RDMS handler 308, etc., and converts this data into a form suitable for the business objects.

Figure 4:
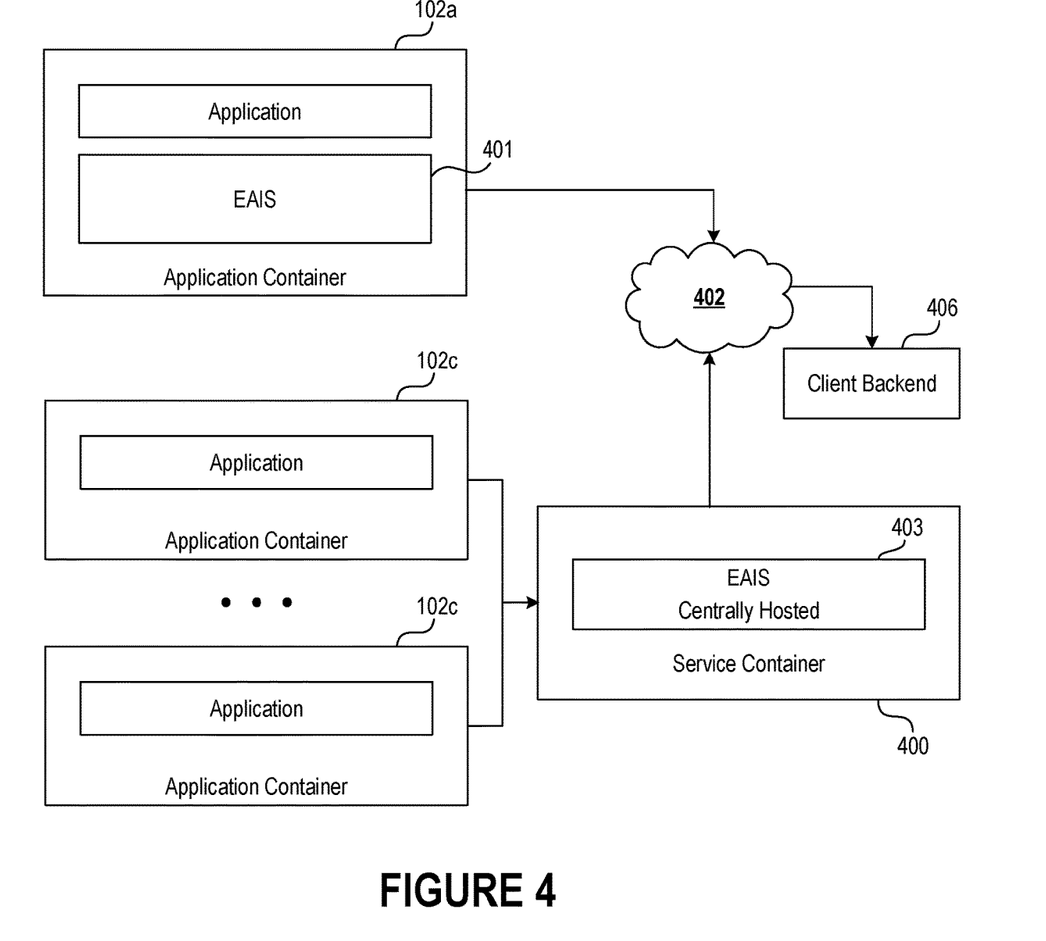
FIG. 4 is a block schematic diagram that shows different ways of deploying EAISs according to the invention.

FIG. 4 is a block schematic diagram that shows different ways of deploying an EAIS according to the invention. FIG. 4 shows the EAIS as embedded in an application container 102*a* according to one embodiment of the invention. FIG. 4 also shows the EAIS hosted as central service 400 for use by multiple applications 102*c*, . . . , 102*n*, according to another embodiment of the invention.

Figure 5:
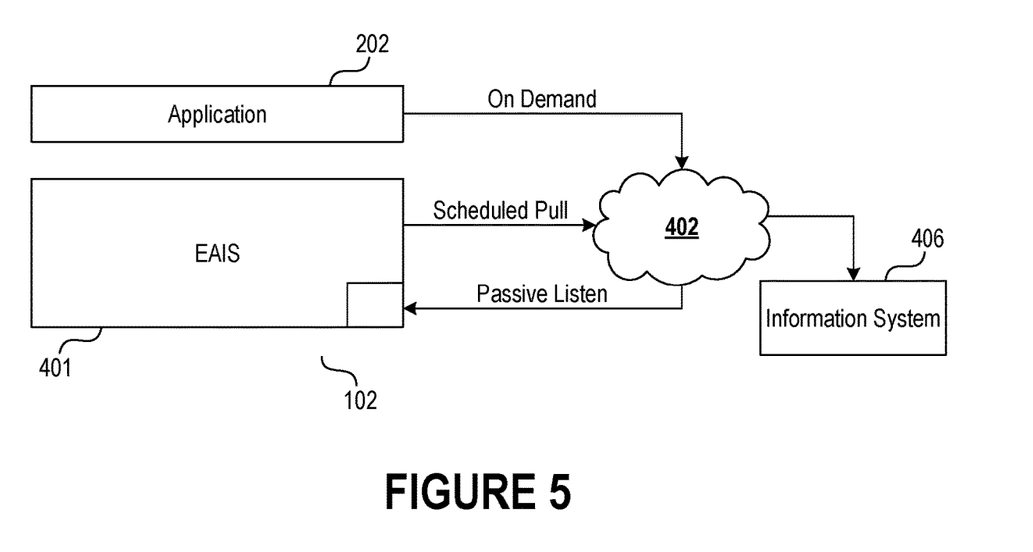
FIG. 5 is a block schematic diagram that shows different modes by which an EAIS retrieves data according to the invention.

FIG. 5 is a block schematic diagram that shows different modes by which an EAIS retrieves data according to the invention. In the On Demand mode, the EAIS retrieves data from the information system at the point when the application requests the data. In the Scheduled Pull mode, the EAIS retrieves information at predefined schedules and makes it available locally, in anticipation of future data requests from the application. In the Passive Listen mode, the enterprise information system itself pushes data to the EAIS based on a predefined condition, for example as and when a new entry or modification occurs.

Figure 6:
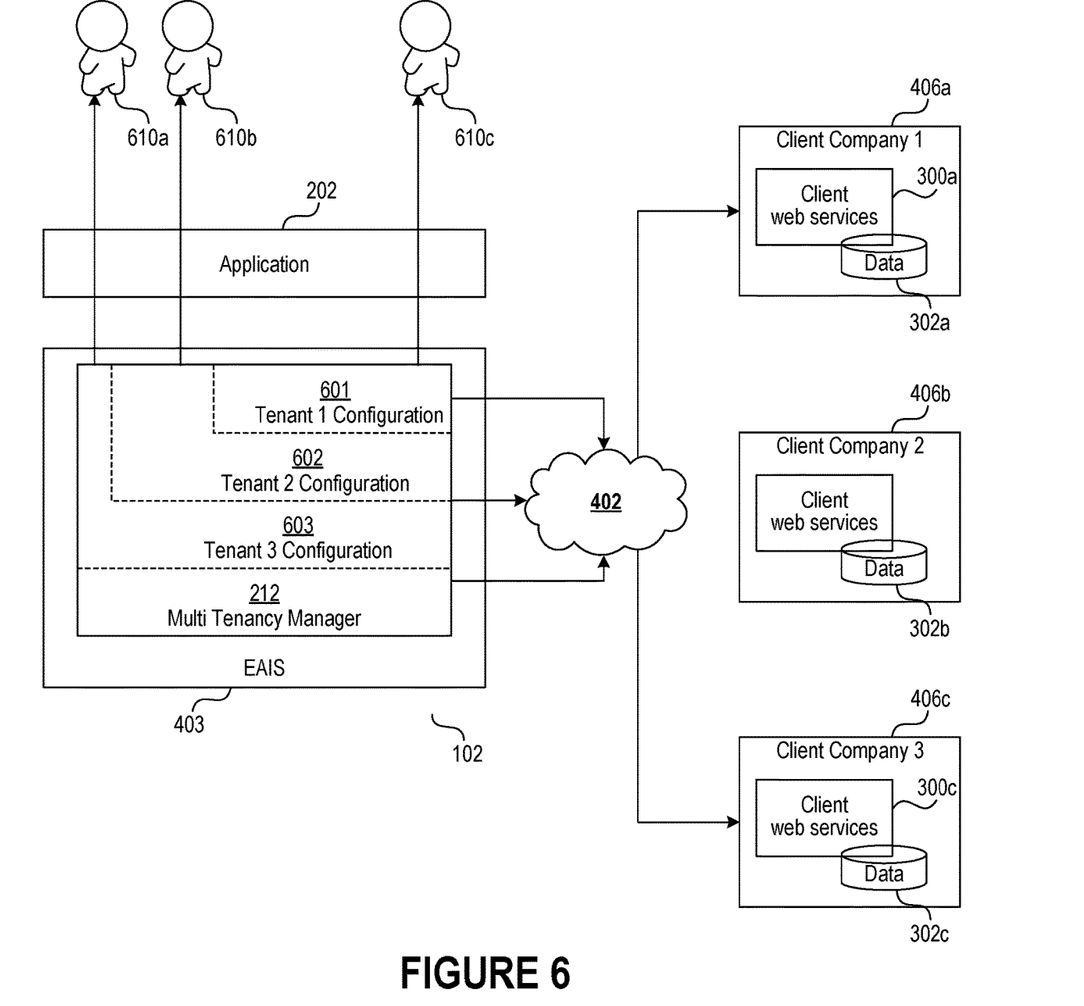
FIG. 6 is a block schematic diagram that shows functioning of multi-tenancy according to the invention.

FIG. 6 is a block schematic diagram that shows functioning of multi-tenancy according to the invention. A plurality of customers 610*a*, 610*b*, 610*c* access the multi-tenant manager 212 of the EAIS 403. The multi-tenant manager 212 contains tenant configurations for Tenant 1 (600), Tenant 2 (602), and Tenant 3 (603). Each tenant may correspond to a respective client company, for example Client Company 1 (406*a*) having client Web services 300*a* and a database 302*a*, Client Company 2 (406*b*) having client Web services 300*b* and a database 302*b*, and Client Company 3 (406*c*) having client Web services 300*c* and a database 302*c*. Thus, the customers may access any of the client companies via resort to the appropriate tenant configuration in the multi-tenancy manager.

For example, the following XML code shows a sample tenant configuration according to one embodiment of the invention. The tenant "tenant1" has one business object "Store" which is mapped to the relational database table "Store" that is accessible through a Java database (JDBC) connection:

```
<tenant name="tenant1">
    <provider name="ProviderA">
        <protocol name="proto1" type="jdbc">
            <properties>
                <property name="connection.driver_class" value="com.mysql.jdbc.Driver"/>
                <property name="connection.url" value="jdbc:mysql://localhost/test"/>
                <property name="connection.username" value="root"/>
                <property name="connection.password" value="root"/>
            </properties>
            <dataformat name="df1" type="jdbc"/>
        </protocol>
        <object name="Store" appObject="Store" protocol="proto1/">
    </provider>
</tenant>
```

Figure 7:
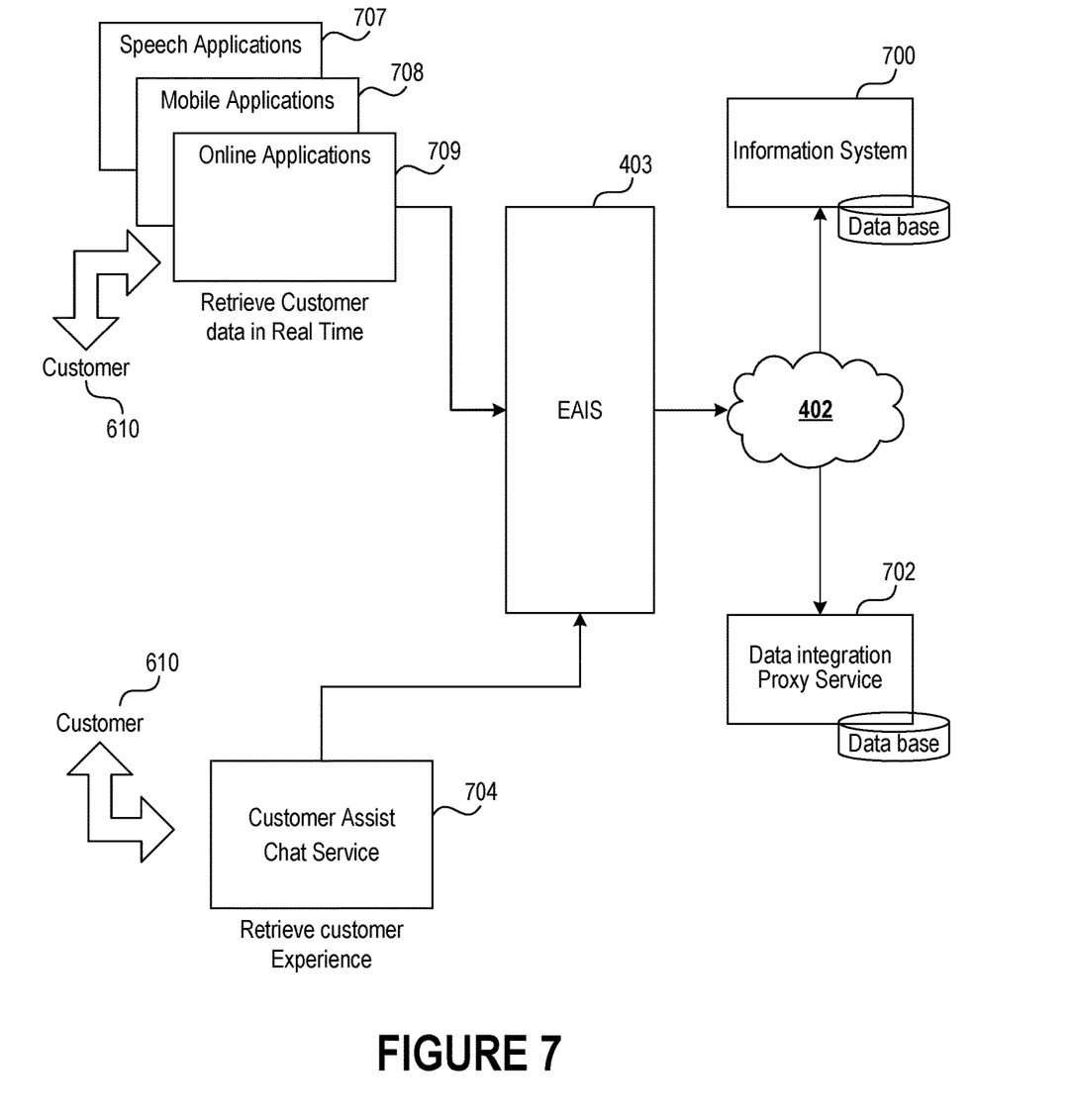
FIG. 7 is a block schematic diagram that shows a system according to another embodiment of the invention.

FIG. 7 is a block schematic diagram that shows a system according to another embodiment of the invention. In FIG. 7, multi-modal customer 610 conversations include customer interactions with appropriate applications for calls, e.g. speech applications 707; Web site visits, e.g. online applications 709; mobile-application sessions, e.g. mobile applications 708; customer chats; e.g. chat service 704. Customers from all interaction modes are connected to the EAIS 403. The EAIS interacts with information systems and their associated data sources 700 (see FIG. 6) or the data integration proxy services 702, fetches the data that is requested by applications, and presents it to the applications. In this embodiment of the invention, the QOS 213 (see FIG. 2) monitors data requests to the EAIS from interactions in a multi-modal conversation, where these interactions can include, for example: calls, Website visits, mobile application sessions, and customer chats.

Business objects are a high level abstraction of business entities, and they can be reused across applications.

The following XML code shows the definition of a business object according to one embodiment of the invention. The object "Store" has the following fields: a Store ID, an Enabled flag, a Store Name, and a Regular Schedule, i.e. a set of opening hours:

```
<xs:schema (namespace stuff not shown) >
    <xs:complexType name="Store">
        <xs:sequence>
            <xs:element name="storeId" type="xs:string"/>
            <xs:element name="enabled" type="xs:boolean" minOccurs="0"/>
            <xs:element name="storeName" type="xs:string" minOccurs="0"/>
        </xs:sequence>
            <xs:element name="regularSchedules" type="app:RegularSchedule" minOccurs="0" maxOccurs="unbounded"/>
    </xs:complexType>
    <xs:element name="Store" type="app:Store"/>
</xs:schema>
```

Business objects can be linked to an information system through a binding that defines how the data elements and operations of the business object map to data elements and operations of the information system. A business object may have separate bindings for each information system.

The following XML code shows the binding of a business object to the columns of a relational database table according to one embodiment of the invention. The business object "Store" maps to the table "store" and its fields map to columns as follows: the field "storeID" maps to the column "storeID"; the field "enabled" maps to the column "classifier_2":

```
<xs:schema
    <xs:complexType name="Store">
        <xs:annotation>
            <xs:appinfo><databinding table="store"></xs:appinfo>
        </xs:annotation>
        <xs:sequence>
        <xs:element name="storeId" type="xs:string">
            <xs:annotation>
                <xs:appinfo><databinding id="true"/></xs:appinfo>
            </xs:annotation>
        </xs:element>
        <xs:element name="enabled" type="xs:boolean" minOccurs="0">
            <xs:annotation>
                <xs:appinfo><databinding column="classifier_2"/>
                </xs:appinfo>
            </xs:annotation>
        </xs:element>
        ...
        </xs:sequence>
    </xs:complexType>
</xs:schema>
```

Figure 8:
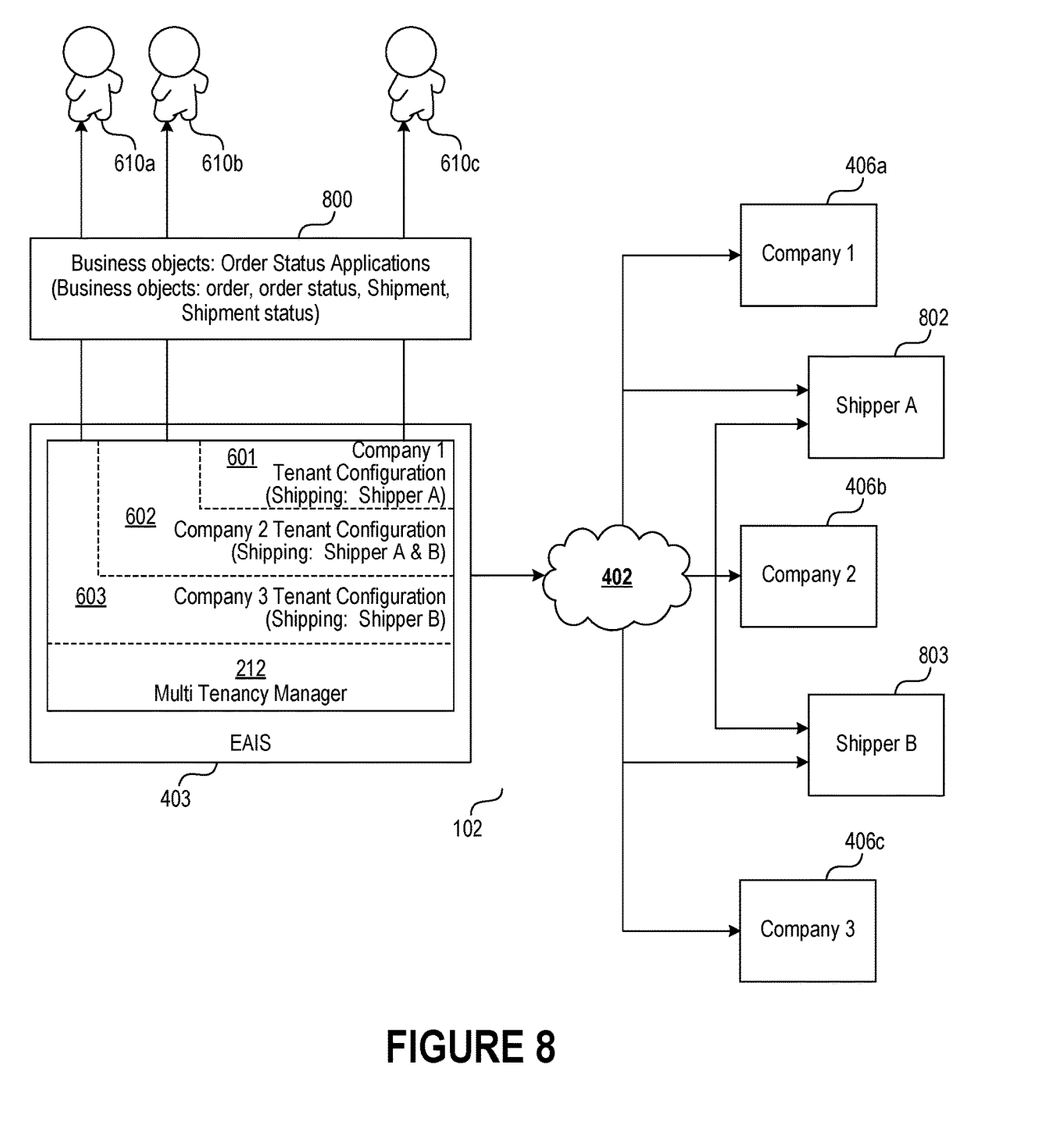
FIG. 8 is a block schematic diagram that shows a system for serving multiple tenants using common business objects according to the invention.

FIG. 8 is a block schematic diagram that shows a system for serving multiple tenants using common business objects according to the invention. Business objects are predefined and can be reused. In this example, the Order, Order Status, Shipment, and Shipment Status comprise the business objects. For each call from a customer 610a, 610b, 610c, the business object logic 800 identifies the tenant configuration to use to connect to the order status and shipping status services of the appropriate client and to use the appropriate business objects accordingly. If a call belongs to Company 1, then the system identifies that Shipper A is the shipping configuration and it connects to the Shipper A server using the business objects order status and shipment status. If call belongs to Company 2, then the system identifies that Shippers A and B comprise the shipping configuration and it connects to the Shipper A and/or B server using same business objects order status and shipment status. If call belongs to Company 3, then the system identifies that Shipper B is the shipping configuration and it connects to the Shipper B server using same business objects order status and shipment status.

Figure 9:
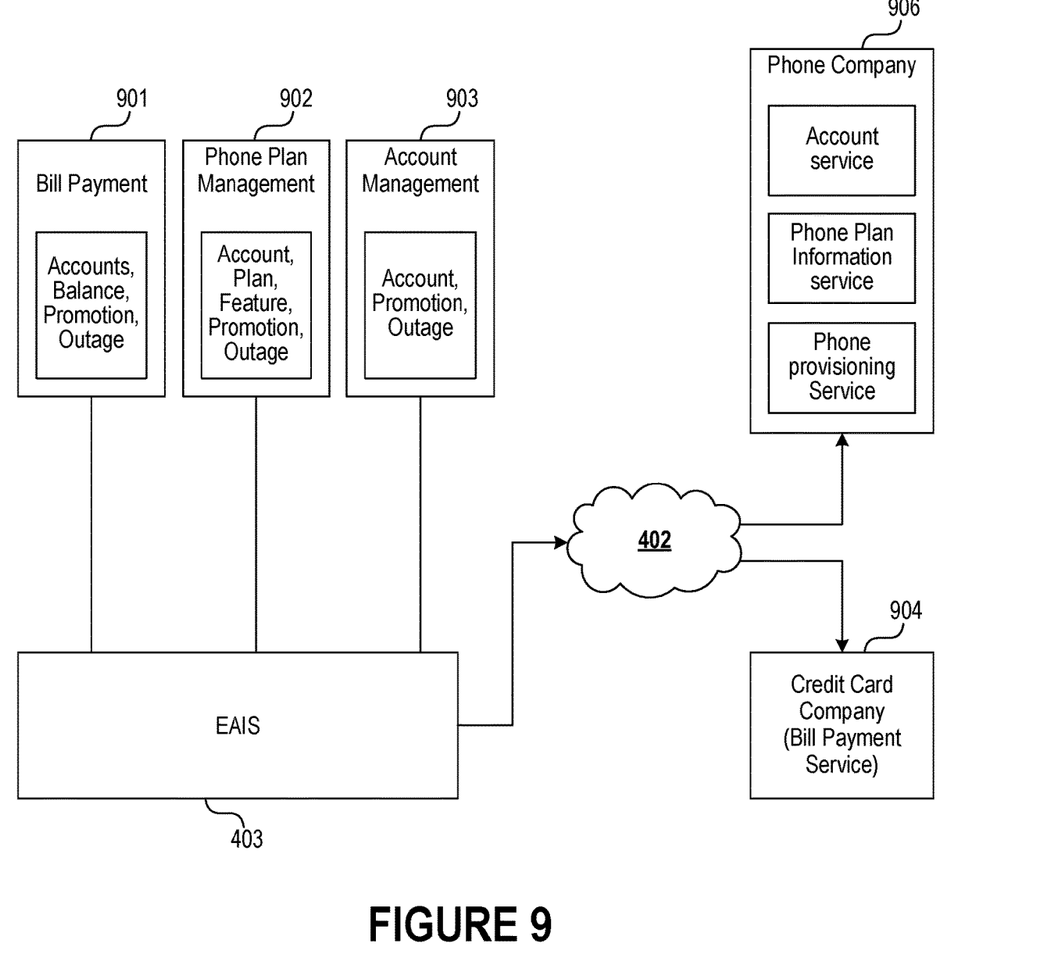
FIG. 9 is a block schematic diagram that shows a system for sharing the same resource among multiple tenants according to the invention.

FIG. 9 is a block schematic diagram that shows a system for sharing the same resource among multiple tenants according to the invention. In FIG. 9, a suite of telephone account management applications 901, 902, 903 all share common business objects and connect to multiple (some shared) client services via the EAIS 403. The Bill Payment application 901 allows the caller to pay bills via the phone; it connects to the credit card company 904 to do so. The Phone Plan Management application 902 allows one to add features to their phone plan, change their phone plan, etc. via connection to the phone company 906. The Account Management application 903 allows one to add a new line, change a password or address, etc. via connection to the phone company 906.

Figure 10:
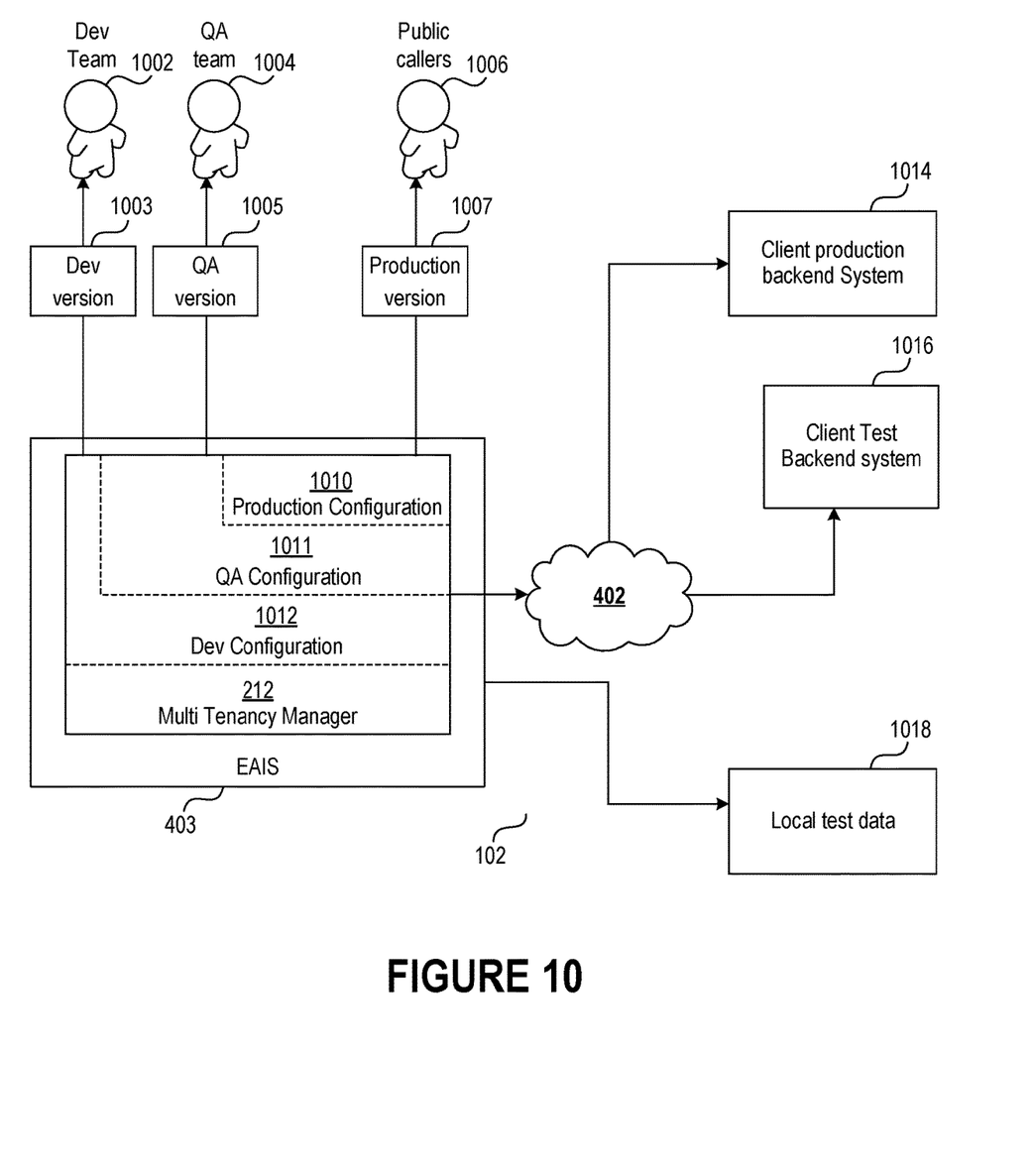
FIG. 10 is a block schematic diagram that shows a system in which multi-tenancy is used to support an application deployment in different environments during the application's lifecycle according to the invention.

FIG. 10 is a block schematic diagram that shows a system in which multi-tenancy is used to support an application deployment in different environments during the application's lifecycle according to the invention. In FIG. 10, multi-tenancy support is used to connect, e.g. the Dev version 1003, QA version 1005, and Production version 1007 to the correct set of backend services. For example, the development instance 1003 connects via the Dev configuration 1012 to a local data store 1018; the production instance 1007 that services live callers connects via the Production configuration 1010 to the Client production instances 1014; and the QA instance 1005 connects via the QA configuration 1011 to the Client Test Backend system 1016. Those skilled in the art will appreciate that this architecture is applicable to many other environments, and that this particular use is provided only for purposes of illustration, and not by way of limitation.

Computer Implementation

Figure 11:
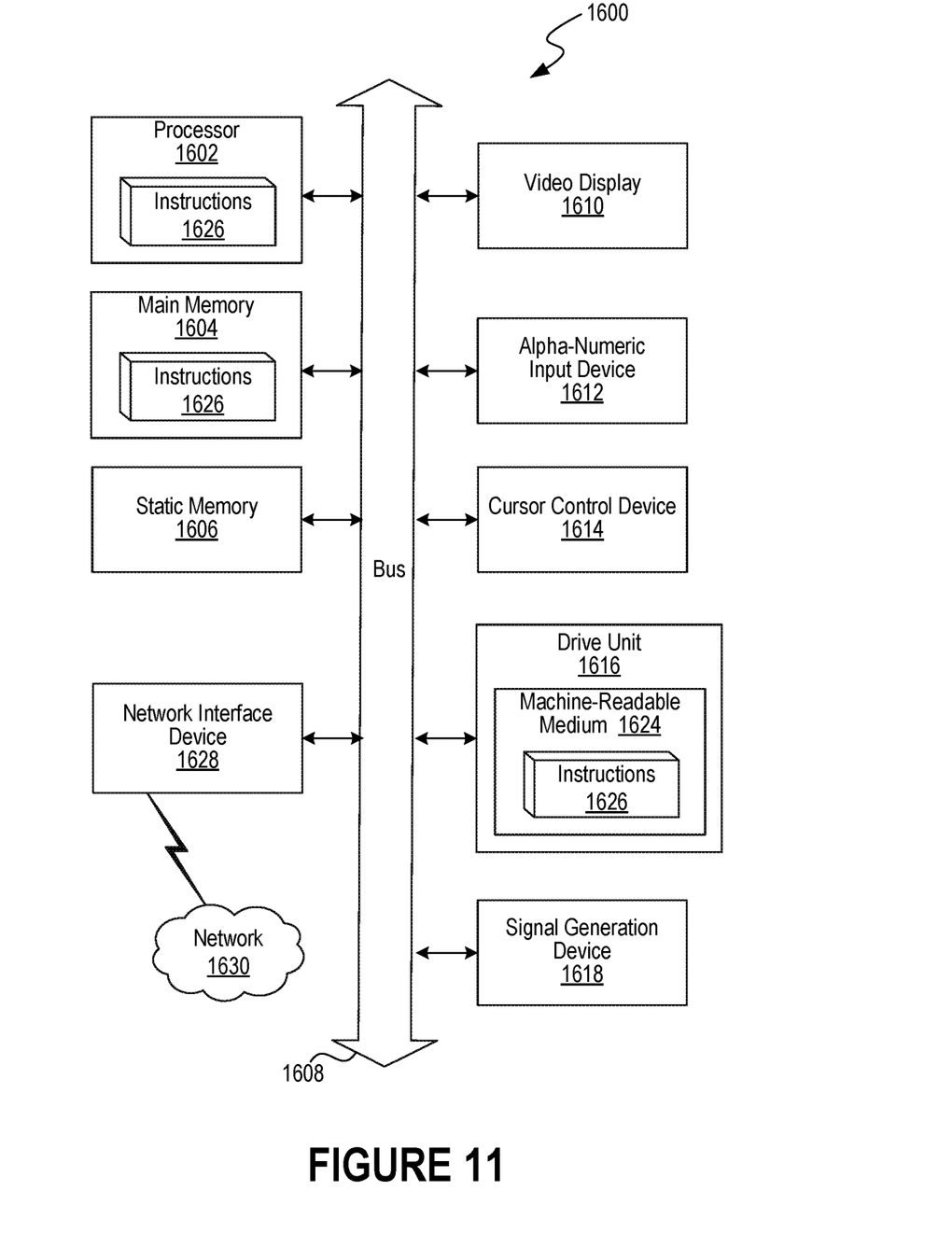
FIG. 11 is a block schematic diagram that shows a machine in the exemplary form of a computer system within which a set of instructions for causing the machine to perform any of the herein disclosed methodologies may be executed.

FIG. 11 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the invention. Accordingly, the invention should only be limited by the Claims included below.

The invention claimed is:

1. A computer-implemented method comprising:
identifying a business object to be used by multiple applications associated with multiple tenants,
wherein the business object includes multiple data elements,
wherein the business object represents a generalization of data spread across multiple information systems in a standardized way, and
wherein the generalization enables each application to independently access a different information system when calling the business object by using only those data elements corresponding to the different information system;
accessing business object logic that represents a mapping of the multiple data elements to at least two information systems;
mapping logical operations assigned to the business object by the multiple tenants to physical operations that are specific to each information system;

receiving, from a first application associated with a first tenant, a first call for the business object;

identifying a first configuration corresponding to the first tenant, the first configuration specifying a first information system of the multiple information systems that is to be queried by the business object;

determining that the first information system is not reachable; and adapting, in response to said determining, behavior of the first application such that the first application communicates with an alternate information system to access data that is not presently accessible from the first information system.

2. The method of claim 1, further comprising:

receiving, from a second application associated with a second tenant, a second call for the business object;

identifying a second configuration corresponding to the second tenant, the second configuration specifying a second information system of the multiple information systems that is to be queried by the business object; and enabling the second application to access information residing in the second information system.

3. The method of claim 2, wherein the first and second calls can be accommodated simultaneously.

4. The method of claim 2, wherein the first and second information systems are different information systems.

5. The method of claim 1, wherein the business object is stored in a repository of business objects that can be shared by the multiple tenants.

6. The method of claim 5, further comprising:

providing a business object manager that allows new business objects to be added to the repository, and allows existing business objects to be modified, and allows existing business objects to be removed from the repository.

7. The method of claim 5, further comprising:

providing a discovery mechanism for discovering the business objects in the repository responsive to receiving input indicative of a request to develop an application.

8. An apparatus comprising:

a memory that includes instructions for managing interactions between applications and sources of data, wherein the instructions, when executed by a processor, cause the processor to:

identify multiple business objects in a repository, wherein each business object includes multiple data elements, wherein each business object represents a generalization of data accessible from multiple sources in a standardized way, and wherein the generalization enables multiple applications to access different sources when calling the same business object;

accessing business object logic that represents a mapping of the multiple data elements of each business object to one or more sources of data;

receiving, from a given application associated with a given tenant, a call for a given business object of the multiple business objects;

identifying a configuration for the given business object that is associated with the given tenant, the configuration specifying a source that is to be queried by the given business object; and enabling the given application to access information made available by the source; and implementing a proactive heartbeat mechanism that permits the given application to determine a priori whether the source is reachable, wherein in response to a determination that the source is not reachable, the proactive heartbeat mechanism prompts the given application to adapt its behavior so that an alternate source is accessed instead of the source.

9. The apparatus of claim 8, wherein the instructions further cause the processor to:

provide an application programming interface (API) that enables the given application to retrieve, update, or execute operations associated with the given business object.

10. The apparatus of claim 8, wherein the instructions further cause the processor to:

implement a retrieval mechanism for retrieving data from a particular source.

11. The apparatus of claim 10, wherein the retrieval mechanism is adjustable on a per-business object, per-application, or per-tenant basis.

12. The apparatus of claim 10, wherein when the retrieval mechanism is in On Demand mode, the processor retrieves data from the particular source when a particular application requests the data.

13. The apparatus of claim 10, wherein when the retrieval mechanism is in Scheduled Pull mode, the processor retrieves data from the particular source in accordance with a predefined schedule.

14. The apparatus of claim 10, wherein when the retrieval mechanism is in Passive Listen mode, the particular source pushes data to the processor based on a predefined condition.

15. A computer-implemented method comprising:

providing an enterprise application integration system (EAIS) for managing interactions between information systems and applications;

providing a multi-tenancy manager that includes a separate configuration for each tenant of multiple tenants;

providing a quality of service (QoS) manager that periodically tests functionality of the information systems to determine operational performance; and providing a business object manager that allows business objects to be created, modified, or deleted as necessary to support the applications, wherein each business object represents a generalization of data spread across multiple information systems in a standardized way, wherein the generalization enables multiple applications to independently access different information systems when calling a single business object, the single business object including multiple sets of logical operations mapped to physical operations specific to the different information systems, and wherein for each call for a given business object by a given application associated with a given tenant, a corresponding configuration is identified, the corresponding configuration allowing a connection to be formed between the given application and at least one information system having the data necessary to ensure the given business object is used appropriately by the given application for the given tenant.

16. The method of claim 15, further comprising:

providing an integration proxy service for facilitating a connection between a particular application and a particular information system responsive to determining that the particular information system lacks an interface for remote access.

17. The method of claim 15, further comprising:
monitoring requests made through the EAIS from interactions in a multi-modal conversation,
wherein the interactions include calls, website visits, application sessions, chats, or any combination thereof.

18. The method of claim 17, further comprising:
measuring quality of information systems accessed in connection with the interactions.

19. The method of claim 15, further comprising:
providing a quality of service (QoS) control for requests made through the EAIS.

20. The method of claim 19, wherein the QoS control has an adjustable rate limit, retry limit, heartbeat mechanism, timeout mechanism, fail-over mechanism, or any combination thereof.

21. The method of claim 15, wherein the QoS manager is further configured to analyze the operational performance of the information systems to determine whether any of the information systems are unsuitable for use by the applications.

22. The method of claim 15, wherein the QoS manager is further configured to monitor requests made by the applications for data in the information systems and store information regarding the requests for further analysis.

23. A computer-implemented method comprising:
identifying a business object to be used by multiple applications associated with multiple tenants,
wherein the business object includes multiple data elements,
wherein the business object represents a generalization of data spread across multiple information systems, and
wherein the generalization enables each application of the multiple applications to independently access a different information system of the multiple information systems when calling the business object by using only those data elements corresponding to the different information system;
for each application of the multiple applications,
mapping logical operations assigned to the business object by the corresponding tenant of the multiple tenants to physical operations that are specific to the corresponding information system of the multiple information systems; and
implementing a proactive heartbeat mechanism that permits the multiple applications to determine a priori whether the multiple information systems are reachable,
wherein in response to a determination that a given information system to be accessed by a given application is not reachable, the proactive heartbeat mechanism prompts the given application to adapt its behavior so that an alternate information system is accessed instead of the given information system.

* * * * *